Oct. 21, 1958 H. A. QUIST 2,856,953
SPHEROID VACUUM RELIEF VALVE
Filed May 21, 1953 2 Sheets-Sheet 2

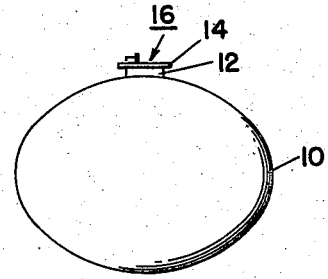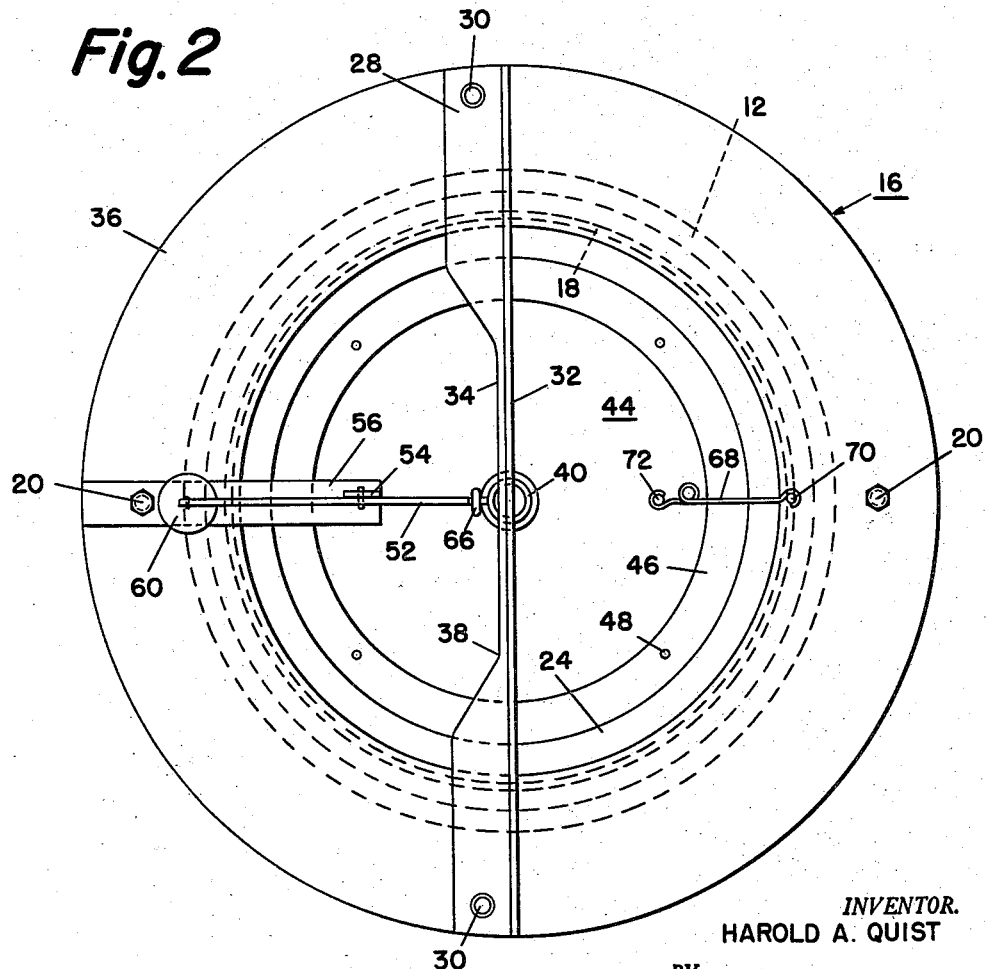

INVENTOR.
HAROLD A. QUIST
BY
Roberto. Spindle
ATTORNEY.

United States Patent Office 2,856,953
Patented Oct. 21, 1958

2,856,953

SPHEROID VACUUM RELIEF VALVE

Harold A. Quist, Swarthmore, Pa., assignor to Sun Oil Company, Philadelphia, Pa., a corporation of New Jersey Application May 21, 1953, Serial No. 356,473

4 Claims. (Cl. 137—467)

This patent relates, in general, to protective devices and more particularly to vacuum breakers used in the testing of closed receptacles.

Specially constructed receptacles, designed to meet certain requirements, are frequently ruptured during testing when a vacuum condition is inadvertently created. A type of vessel under consideration is the spheroid used to store highly volatile hydrocarbon fractions. The purpose of such containers is to resist high and variable internal pressures, but not much more than atmosphere when applied externally. Consequently, any decrease below atmospheric pressure, internally, may fracture, if not totally destroy, these special storage forms.

During normal operating conditions, pressure is maintained within the typical spheroid shaped vessel. To prevent excessive pressures from accumulating to rupture the vessel from within, pressure relief valves form a part of the storage facility. However, under these conditions and in general under the conditions for which these containers are designed, vacuum relief valves are not required. Where vacuum relief valves are used on such storage vessels, they are set to relieve vacuum conditions for a very small differential between outside and inside pressures. Consequently a sudden or excessive vacuum condition, if not promptly and fully relieved, will destroy the vessel. Under normal operating conditions such vacuum relief requirements seldom if ever arise.

Under cleaning and test conditions, however, it is not unusual to lose a spheroid by collapsing under the weight of atmospheric pressure. This vacuum condition has arisen by too rapidly draining the spheroid either correctly through a drain valve or by draining rapidly through an open seam between plates. It is one object of this disclosure to provide a vacuum breaker for use in testing receptacles not equipped with like devices or to augment otherwise too severe limitations of small capacity vacuum relief valves.

A further object is to provide a vacuum breaker incapable of clogging, sticking, or otherwise delaying operation.

Still a further object is to provide a vacuum relief device in which intermittent operation is eliminated, and once having reached a predetermined value opens wide and remains open to admit atmospheric pressure to the vessel.

Another object is to provide a vacuum relief device which in the closed position forms a test seal for internal positive pressure conditions.

Yet another object is to provide a vacuum breaker which is unresponsive to minor vacuum fluctuations and will not operate until a selected vacuum condition arises, assuring positive test facilities.

Still another object is to provide a vacuum breaker, readily portable for use with any selected vessel in a standard manhead opening.

The general object may be stated as being to provide a protective mechanism, incapable of mechanical failure, with no limiting or restrictive elements to prevent full, complete and predetermined operation. In addition, there is no required maintenance and the device is simple to manufacture. Further it is easy to understand and operate.

Together with the foregoing stated objects, other objects will become evident in the following specification and the accompanying drawings wherein:

Figure 1 is an elevation of a spheroid showing the vacuum breaker in place in a manhead.

Figure 2 is a plan view of the device positioned in a manhead.

One advantage of the vacuum breaker means described here, and noted as one of the objects, is the facility of use in a manhead of a storage vessel. In compliance with the standard specifications controlling the design and manufacture of storage tanks, manheads are always included in the types considered here. Further these fabricated openings are situated in the body of the tank to facilitate inspection and repair by trained personnel. It will be understood, therefore, that the necessary framework to support the described breaker is available on all the tanks considered here.

Figure 3:
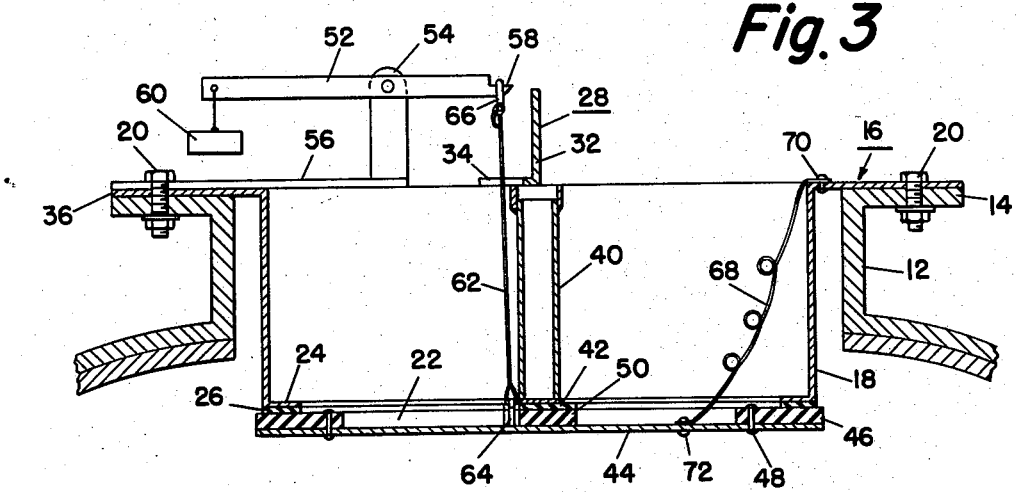
Figures 3 and 4 are sectional elevation views of the device in the closed and open positions respectively.

Referring now to the drawings for a more specific description of the invention, and in which like parts are designated by like characters throughout several views, Figures 1, 2 and 3 will be referred to in the description of the elements. All these figures together with number 4, will be used in describing the operation.

Figure 1 indicates a typical spheroid 10 in elevation, less supports and other unnecessary attachments not needed here to complete the description of the invention. A typical manhead 12, flanged at 14, is shown supporting one embodiment of the vacuum breaker inclusively designated by the numeral 16.

In Figures 2 and 3, these elements are shown in larger scale and in operating relation. The upper flange 14 of manhead 12 is shown supporting the body member 18 of the vacuum breaker 16. This body member 18 is shaped, in cross section, to fit the hole in the manhead and is of sufficient depth to extend into the interior of the tank for freedom of operation. As shown here it resembles a pan slightly modified to serve this specific purpose. Peripherally, the body member 18 is fastened through existing bolt holes to the flange 14 as by bolts 20. As shown in Figure 2 there are several of these attaching bolts 20 shown, located at critical points. There may be more if desired, depending on the pressure to be used for test purposes, and which the device must withstand.

The bottom of the pan or body member 18 is open as at 22, enclosed by a flanged portion 24 forming a ring and boundary of the aperture. In addition to lending rigidity to the pan 18, which may be fashioned from aluminum or other light weight metal, it supplies a surface for a gasket seal 26. This seal is preferably made of rubber or other material which when opposed by like or other material will not stick but be easily separated. Such material is connected to the flanged surface and circumscribes the opening 22.

Across the top of the pan 18, the support bracket 28 is attached to pass across the center of the pan. Although bolts similar to those designated by the numeral 20 may be used to fasten bracket 28 in place, it is simpler to attach the bracket permanently by rivets 30. In this way the bracket remains as a permanent part of the device and forms an easy carrying means. One leg 32, in cross-section, is bent upward to make the bracket rigid, while the other leg 34 is flat to engage the upper flange 36 of the pan 18. The leg 34 is partially cut away as at 38 to assist in unobstructed operation to be described later.

In the approximate center of the pan 18 over which the bracket 28 extends, a piece of tubing 40 projects downwardly to the bottom of the pan forming a brace. This tube 40 is welded or otherwise fastened to the bracket and is permanently and firmly fixed in position at substantially the center of the device. Downwardly the tube extends to a line with the flange ring 24 and has a gasket seal 42 also.

A removable cover 44 shaped to conform substantially with the periphery of pan 18 is designed to engage the flange 24. This cover is preferably flat without braces keeping the weight at a minimum and reducing the dimensions to the least possible thickness. Such construction reduces the moment of inertia of the mass permitting more rapid operation. Around the periphery a piece of sealing material 46 is fastened as by rivets 48 to fit snugly against the gasket seal 24. A similar piece of material, rubber for example, is spotted in the center of the cover 44 to butt against the bottom of the tube 40, as at 50.

The cover 44 is latched into tight sealing engagement with the pan 18 at the seal covered portions. The latching means which holds the cover in the closed position includes the lever 52. A fulcrum 54 is indicated and is supported on the bracket 56 extending from the pan 18 upper flange 36 approximately at right angles to the bracket 28. The end of lever 52 extending toward the center of the vacuum breaker device is fashioned into a form of hook retainer 58, while the other end supports a weight 60.

Figure 4:
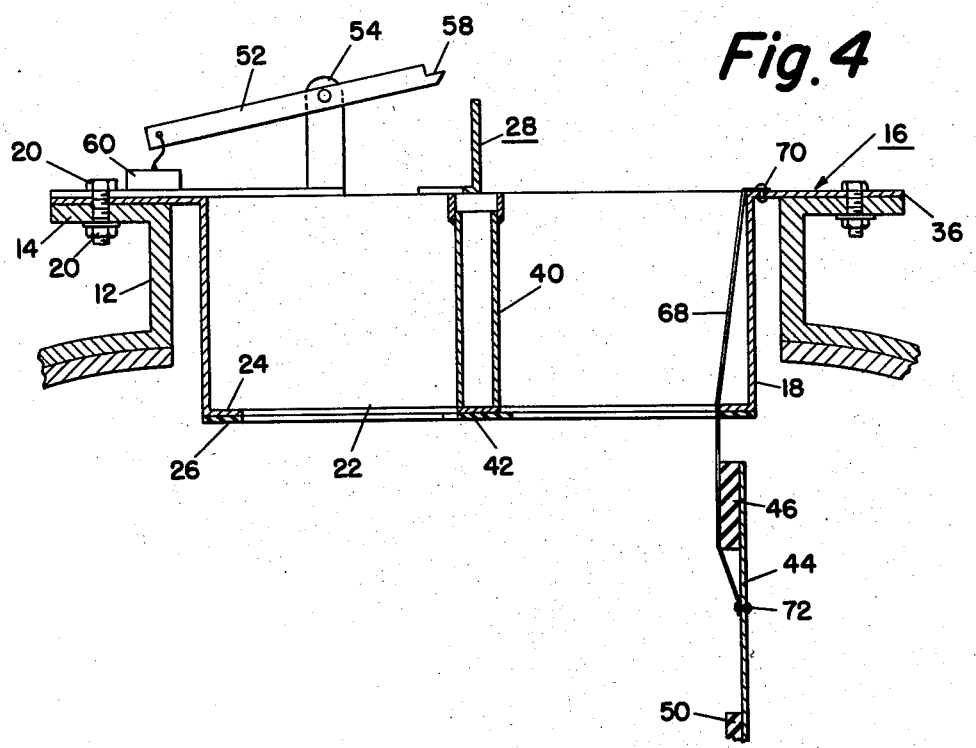

Between the hook end 58 of the lever 52 and the cover 44 a flexible link 62, shown as a cord, stretches. The cover end of the cord 62 is fastened as in the eye 64 to the cover. At the hook end of the cord a simple ring 66 is selected to engage the lever, being ready to slide off when the lever 52 is tilted. Finally, to prevent the cover 44 from being lost, a second cord 68 is attached to the pan 18 at 70 and to the cover 44 at 72. As shown in Figure 4, once released the cover hangs by the cord 68 until recovered.

It will be evident that the above described device can be used as either a permanently or temporarily installed vacuum breaker on any vessel equipped with a manhead. Further, the disclosed device may be used separately or in conjunction with other vacuum relief devices. Or it may be used, as a gauge, for the specific purpose of ascertaining what particular force must be present before the vacuum is broken. Any or all of these uses will be envisioned by those acquainted with the art from the above description. To emphasize these uses, and particularly the specific purpose of using this device with the test of a spheroid, this operation of the disclosed vacuum breaker will be described.

The necessity for such a device will be apparent when two known failures through collapse of spheroids are studied. In one case the spheroid was empty and closed. Sudden clouding of a bright sun and some rain falling on a sphere which was being steam cleaned internally caused it to collapse. In this instance, the existing vacuum relief valve did not function fully in time to save the tank. A second case of collapse was caused by the leak of liquid from the body of the spheroid during a water test. The suddenly created vacuum collapsed the tank in both instances. In either case the disclosed device would have saved the structure.

Preliminary to making a spheroid ready for inspection and test, the stored fluids are removed with proper safety precautions. The manheads are opened, the tank cleaned and tested. Prior to closing the tank again for inspection and test, one or more manheads are removed and the vacuum breaker 16 fastened therein, in place of the normal cover. Either weight 60 or the inwardly extending end of lever 52, or both, are calculated to cooperate in holding the cover 44 against the seals with desired force. The linkage 62 is secured to the hook end 58 of the lever 52.

The tank under inspection must be tested to withstand a desired amount of pressure. Although pressure from the inside of the vessel will not operate the vacuum breaker, the device must act as a seal and be able to resist the force. The cover 44 is preferably a light weight, thin section of metal as described above. Under high internal pressures it will buckle outwardly unless crimped or supported. In the device now considered, the tube 40 projecting downwardly from the bracket 28 is positioned to abut the cover at the point of greatest flexibility, that is, the center. Under the effects of internal pressures, the cover 44 presses against the perimeter and center seals, 24 and 42, on the pan super structure. No crimping is necessary and the cover may be made thin and of little mass. The pan 18, forming the supporting structure for insertion in the manhead, is fastened by bolts 20 to the flange 14.

On a vacuum condition becoming effective in the spheroid, the downward atmospheric pressure on the top of the cover 44 is countered by the weight 60 and lever 52 exerting a pull on the cover through the cord 62. This static condition will remain inoperative until the vacuum condition increases to make the total outside pressure great enough to force the cover downwardly.

When the cover 44 moves to the open position, the lever 52 is tipped downwardly on the hook end. The ring 66 slides off the hook 58 and the cover drops and hangs by the cord 68 leaving an unobstructed path for the inrushing air. This opening into the vessel remains unobstructed until closed by the operators preventing further vacuum accumulation.

It is evident that a vacuum breaker of few simple parts and easy operation is provided for the protection of storage vessels. The complete device is readily transportable to any tank being tested, or for use where required. A wide variety of predetermined settings are available, giving flexibility for inspection purposes. Inasmuch as the device operates once and completely, there is no danger of involved moving parts failing to function.

The above describes one form of device found successful. Many modifications of this basic idea are immediately evident and may be made without departing from the spirit of the invention. This invention, therefore, is not to be restricted except insofar as is necessitated by the prior art and by the spirit of the appended claims.

I claim:

1. A vacuum breaker for storage tanks comprising a pan shaped body member flanged outwardly at the top to provide a fastening surface and having an aperture in the bottom thereof, a support bracket extending substantially across the center of the pan shaped body supported by the flange, a bracing tube affixed to the bracket at the approximate center of the pan positioned to project downwardly the depth of said pan, a lever pivotally supported by said flange to project one end inwardly above the center of the pan, weight means engaging the outwardly extending end of the lever, a cover closing the aperture in the bottom of the pan held against said pan by a supporting link releasably engaging the inwardly extending end of said lever, and seal means between the cover, pan and bracing tube to severably engage the same.

2. In a storage tank having a manhole opening, a pan secured peripherally to the manhole and extending down into the tank and whose bottom is provided with an opening, a closure for said opening appliable to the pan and adapted to seal said opening, means to maintain said opening sealed until the pressure in the tank falls a predetermined degree below atmospheric pressure; said means comprising a tension device and a connector secured at one end to the closure and at its other end releasably attached to the tension device, said attachment being maintained until the pressure in the tank falls below said predetermined sub-atmospheric pressure, whereupon the atmospheric pressure acts upon the closure with a force adequate to release the attachment between the tension device and the connector, thereby displacing the closure and allowing free access of atmospheric air to the tank.

3. The combination defined in claim 2 including also a separate connector between the manhole and the closure maintainable during both the sealing and displaced positions of the closure, permitting ready replacement of the displaced pan and reattachment of the first-named connector to the tension device.

4. In a storage tank having a manhole opening, a pan-shaped body member secured to the tank and extending down into and across the manhole opening and having a bottom opening therein, a closure for said bottom opening and means to hold such closure in closed position unless the pressure within the tank falls a predetermined degree below atmospheric pressure, said means comprising a pivoted lever and a connector between said lever and the closure, the lever being fulcrumed between its ends and extending above and radially of the body member and weighted at its outer end holding the closure in a closed position against exterior atmospheric pressure until the internal tank pressure falls below atmospheric pressure, and the upper end of the connector being adapted to rest on the inner end of the lever but to slide thereoff upon displacement of the closure from its closed position and the resultant tilting down of the inner end of the weighted lever.

References Cited in the file of this patent

UNITED STATES PATENTS

| | | |
|---|---|---|
| 216,801 | Miller | June 24, 1879 |
| 328,451 | Barbe | Oct. 20, 1885 |
| 355,919 | Cant | Jan. 11, 1887 |
| 1,626,721 | Cohn | May 3, 1927 |
| 1,751,684 | Diederich | Mar. 25, 1930 |
| 2,169,410 | Drane | Aug. 15, 1939 |
| 2,297,003 | Larson | Sept. 29, 1942 |
| 2,370,040 | Jackson | Feb. 20, 1945 |
| 2,402,913 | Poulter | June 25, 1946 |
| 2,593,376 | Willis | Apr. 15, 1952 |